United States Patent [19]
Matsumura et al.

[11] Patent Number: 5,887,673
[45] Date of Patent: Mar. 30, 1999

[54] MOTORCYCLE

[75] Inventors: Tetsuro Matsumura; Yuji Sonoda, both of Hamamatsu, Japan

[73] Assignee: Suzuki Kabushiki Kaisha, Japan

[21] Appl. No.: 848,606

[22] Filed: Apr. 29, 1997

[30] Foreign Application Priority Data

Apr. 30, 1996 [JP] Japan .................................. 8-109919

[51] Int. Cl.[6] .............................................. B62K 61/02
[52] U.S. Cl. ......................................... 180/219; 180/312
[58] Field of Search .................................. 180/219, 225, 180/228, 311, 312

[56] References Cited

U.S. PATENT DOCUMENTS

| Re. 31,877 | 5/1985 | Nomura ................................. | 180/219 |
| 4,226,296 | 10/1980 | Higaki .................................... | 180/219 |
| 4,364,340 | 12/1982 | Kimura ................................... | 180/219 |
| 4,577,719 | 3/1986 | Nomura et al. ......................... | 180/219 |

*Primary Examiner*—Kevin Hurley
*Attorney, Agent, or Firm*—Ronald P. Kananen; Rader, Fishman & Grauer

[57] ABSTRACT

A motorcycle has a head pipe supporting a steering shaft, a pair of bilateral main frame pipes having front ends fixed to the head pipe and extending rearward therefrom, an engine unit disposed below the main frame pipes and having cylinders projecting obliquely forward from an engine casing, an air cleaner covered by an air cleaner casing which is disposed between both the main frame pipes, and intake devices extending upward from the cylinders and having air intake inlet portions inserted into the air cleaner casing. The air cleaner casing has a bottom portion to which a downwardly protruded portion is formed at a rear position of the intake devices, and the main frame pipes are connected through a first coupling member disposed between the intake devices and the protruded portion of the air cleaner casing. The air cleaner casing is formed with a recessed portion at the bottom portion thereof, and the recessed portion has a shape suitable for accommodating the first coupling member. A pair of bilateral head frame pipes are further provided so as to be fixed at the front ends thereof to the head pipe and extending rearward therefrom below the location of the main frame pipes, and second coupling members connecting the first coupling member to each of the head frame pipes are also arranged.

6 Claims, 4 Drawing Sheets

MOTORCYCLE

BACKGROUND OF THE INVENTION

The present invention relates to a motorcycle particularly provided with an improved frame structure having a pair of main frame pipes arranged on both sides in a width direction of a motorcycle body.

A motorcycle provided with a known frame structure and structures associated therewith is shown in FIG. 5.

With reference to FIG. 5, a motorcycle has a frame A mainly composed of a head pipe B rotatably supporting a steering shaft and a pair of main frame pipes C, C fixed at front ends thereof to the head pipe B and extending rearward therefrom on both sides in a width direction of a motorcycle body. An air cleaner casing D is disposed between the main frame pipes C, C, and the surrounding of the air cleaner casing D is covered by a fuel tank. An engine unit E is suspended from the frame A at a portion below the air cleaner casing D, air-intake devices F, F, having leading end openings Fa, Fa inserted into the air cleaner casing D, are coupled with the engine unit E. The air-intake devices act to mix fuel jetted from an ignition means with an intake air from the air cleaner and supply the air/fuel mixture to the engine unit.

In the conventional structure of the motorcycle having paired main frame pipes mentioned above, it has been required for the frame A provided with the paired main frame pipes to be connected with each other by means of a coupling member for increasing the rigidity thereof against torsion or twisting motion applied thereto. However, in the structure mentioned above, because of the location of the air cleaner casing between the main frame pipes C, C, it was in fact impossible to arrange a coupling member therebetween. Of course, although it may be possible to locate the coupling member by eliminating a portion of the air cleaner casing interfering with the coupling member, in such arrangement, the capacity or volume of the air cleaner is reduced, resulting in a problem of lowering the intake performance.

SUMMARY OF THE INVENTION

An object of the present invention is to substantially eliminate defects or drawbacks encountered in the prior art described above and to provide a motorcycle having a frame structure having a high rigidity with respect to the torsion or twisting motion thereof while maintaining a sufficient volume of the air cleaner.

This and other objects can be achieved according to the present invention by providing a motorcycle having a head pipe supporting a steering shaft, a pair of bilateral main frame pipes having front ends fixed to the head pipe and extending rearward therefrom, an engine unit disposed below the main frame pipes and having cylinders projecting obliquely forward from an engine casing, an air cleaner covered by an air cleaner casing which is disposed between both the main frame pipes, and intake devices extending upward from the cylinders and having air intake inlet portions inserted into the air cleaner casing, the air cleaner casing having a bottom portion to which a downwardly protruded portion is formed at a rear position of the intake devices, and the main frame pipes being connected through a first coupling member disposed between the intake devices and the protruded portion of the air cleaner casing.

In preferred embodiments, the air cleaner casing is formed with a recessed portion at the bottom portion thereof, the recessed portion having a shape suitable for accommodating the first coupling member. The recessed portion has an inner space having a volume corresponding to an inner volume of the protruded portion.

The motorcycle further comprises a pair of bilateral head frame pipes having front ends fixed to the head pipe and extending rearward therefrom below the location of the main frame pipes, and second coupling members connecting the first coupling member to each of the head frame pipes.

The first coupling member is arranged at a portion near and below the inlet portions of the intake devices inserted into the air cleaner casing.

The cylinders provides a V-shape in a side view of a motorcycle body and includes a front side cylinder projecting obliquely forward from the engine casing and the protruded portion of the air cleaner casing is positioned between the V-shaped cylinders.

According to the structures and characters of the present invention described above, since both the main frame pipes are connected through the first coupling member, the rigidity against the twisting force of the entire frame structure of the motorcycle can be improved. Moreover, the inner volume of the air cleaner casing can be ensured by the provision of the protruded portion positioned rear side of the first coupling member.

Furthermore, both the head frame pipes are also connected to the first coupling member through the second coupling members, the rigidity of the entire frame structure can be further improved.

The nature and further features of the present invention will be made more clear from the following descriptions made with reference to the accompanying drawings.

DESCRIPTION OF THE PREFERRED EMBODIMENT

One preferred embodiment of the present invention will be described hereunder with reference to FIGS. 1 and 2.

Figure 1:
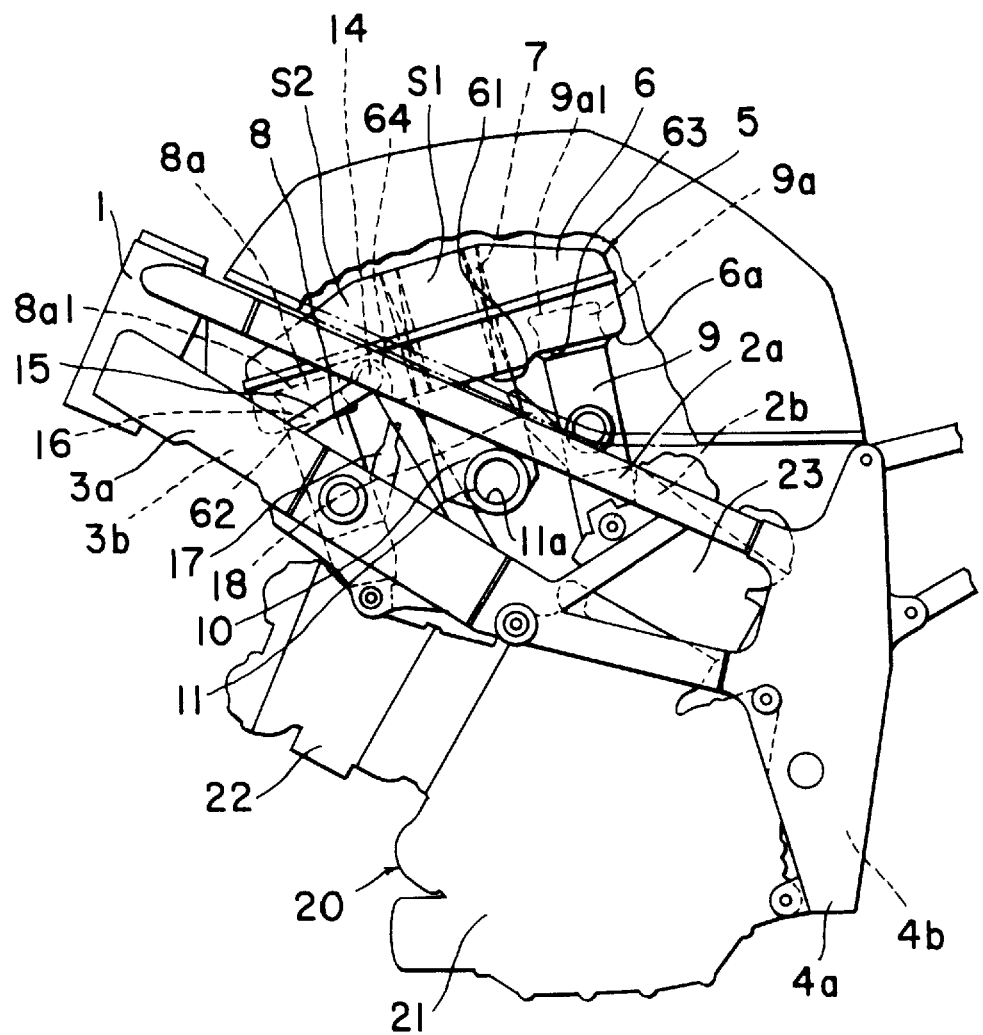
FIG. 1 is a side view, partially cut away, showing a frame structure and structures associated therewith of a motorcycle according to one embodiment of the present invention.
Figure 2:
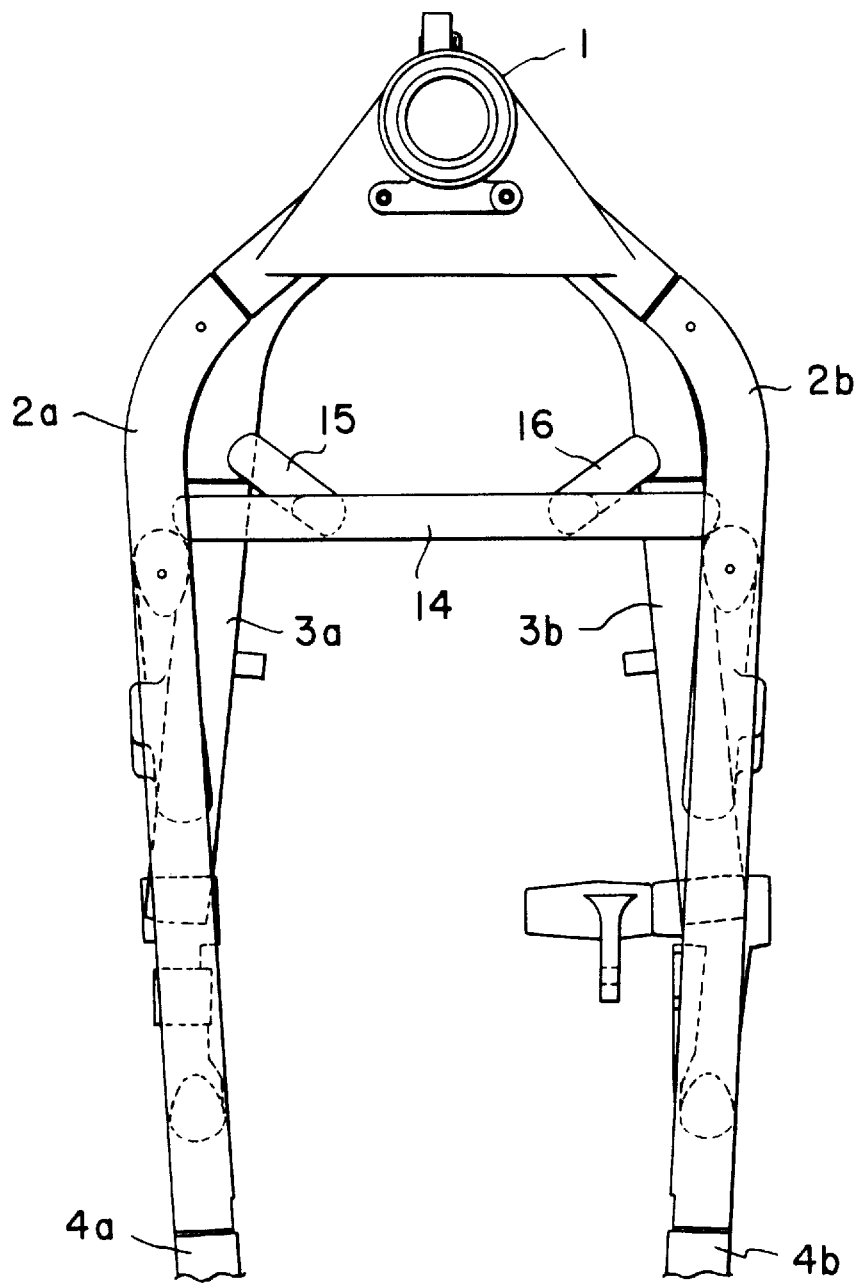
FIG. 2 is a plan view of the frame structure of the motorcycle shown in FIG. 1.

A frame structure of a motorcycle shown in FIGS. 1 and 2 has a front side end portion (in a running direction of the motorcycle) to which a head pipe 1 for supporting a steering shaft is connected, and front end portions of a pair of bilateral main frame pipes 2a and 2b are connected to the head pipe 1 so as to extend obliquely downward in a rearward direction, respectively. A pair of bilateral head frame pipes 3a and 3b have front end portions which are connected to the head pipe 1 at the lower portions of the main frame pipes 2a and 2b and the rear end portions connected to frame rear end portions 4a and 4b, respectively.

Figure 5:
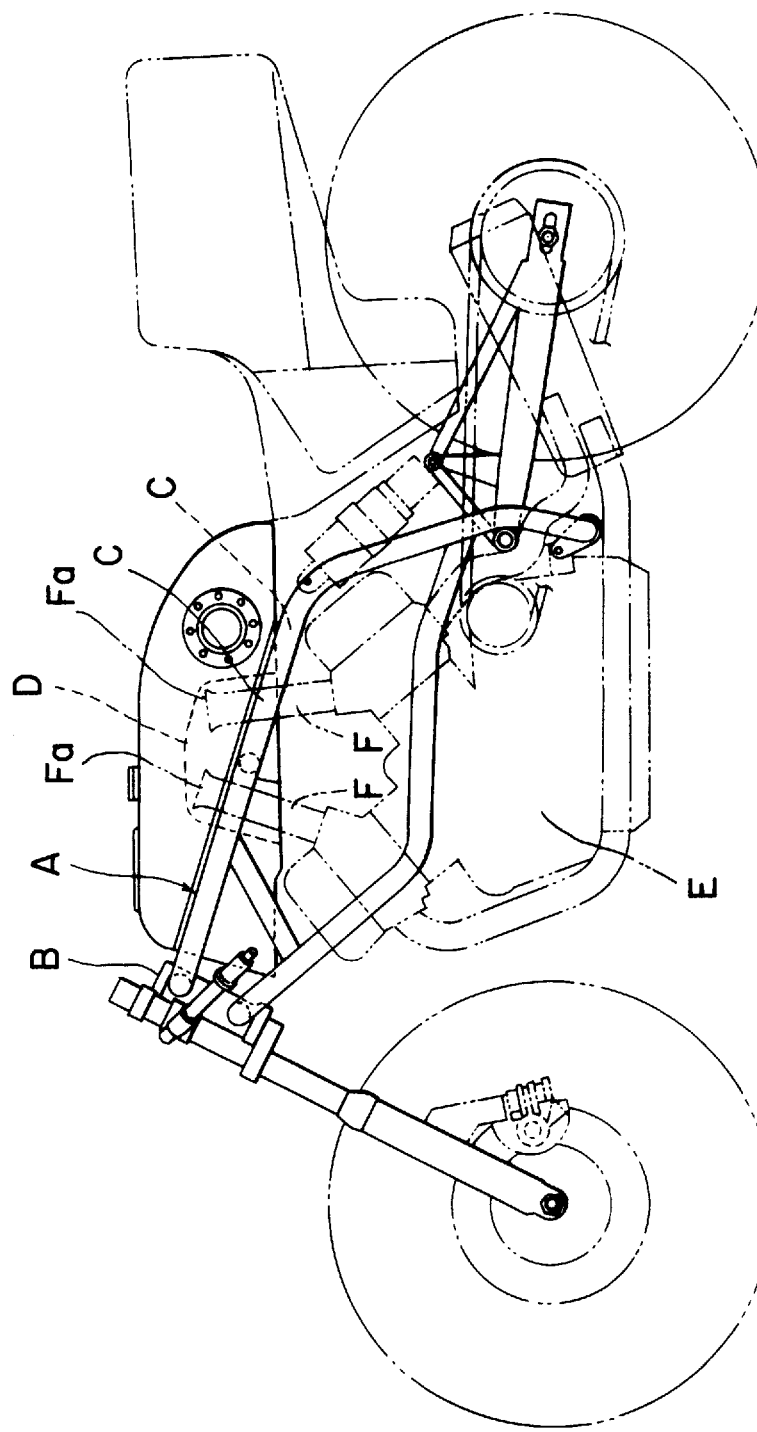
FIG. 5 is an illustration of a side view of a motorcycle having a conventional frame structure and structures associated therewith.

It is to be noted that the embodiment of the present invention shown in FIGS. 1 and 2 is applied to a motorcycle shown in FIG. 5.

As shown in FIG. 2, in a plan view, the paired main frame pipes 2a and 2b and the paired head frame pipes 3a and 3b are curved outward in a width direction of the motorcycle body from the portions connected to the head pipe 1. An engine 20 is supported by the head frame pipes 3a and 3b and the frame rear end portions 4a and 4b at plural portions, and the engine 20 of the present embodiment is a V-type engine in which cylinders 22 and 23 are arranged in an engine casing 21 so as to provide a V-shape in a side view in a manner such that the front side cylinder 22 projects obliquely forward from the engine casing 21 and the rear side cylinder 23 projects obliquely backward therefrom.

Figure 3:
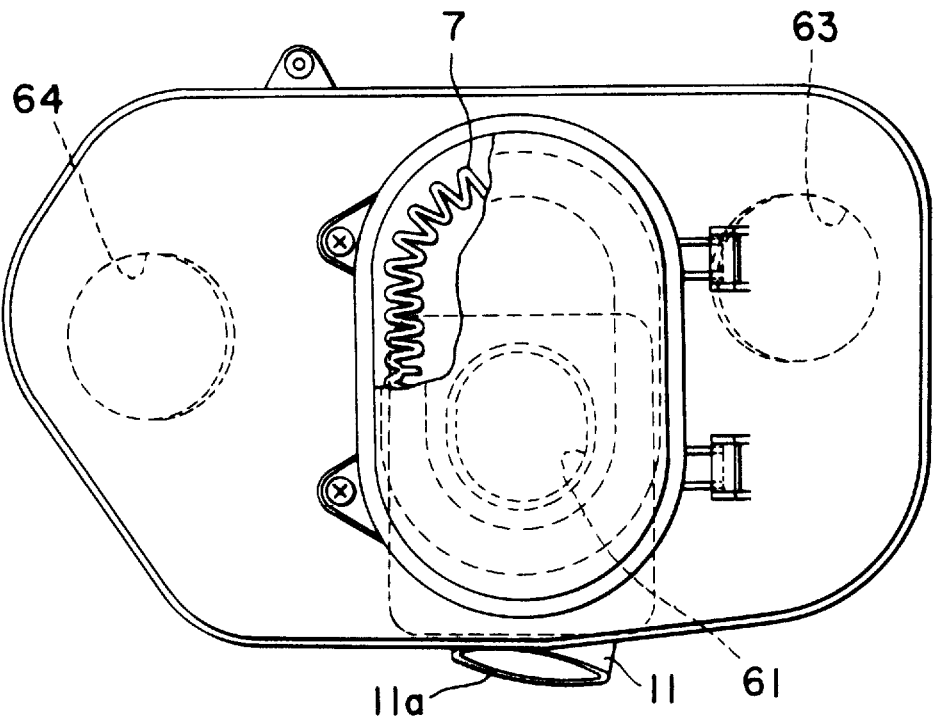
FIG. 3 is a plan view, partially cut away, of an air cleaner shown in FIG. 2.
Figure 4:
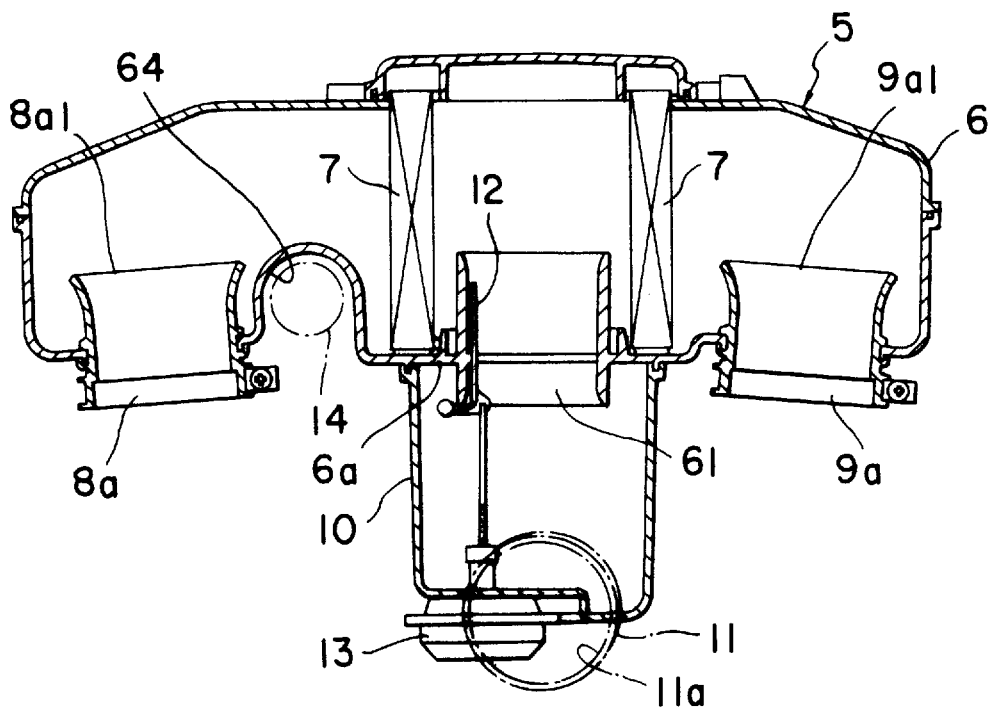
FIG. 4 is an elevational section of the structure shown in FIG. 3.

An air cleaner 5 is arranged between a bilateral pair of main frame pipes 2a and 2b, the details of the air cleaner 5 being shown in FIGS. 3 and 4.

With reference to FIGS. 1, 3 and 4, the air cleaner 5 has an outer structure formed by a hollow air cleaner casing 6 in which a cylindrical element 7 is accommodated. The air cleaner casing 6 has a bottom portion 6a to which inlet port 61 communicated with a dirty side space S1 surrounded by the element 7 is formed and exhaust ports 62 and 63 communicated with a clean side space S2 defined outside of the element 7 are also formed to the front and rear portions of the inlet port 61 in a manner separated from each other by a predetermined distance. Coupling cylinders 8a and 9a forming the upper end portions of intake devices 8 and 9 connected to the respective cylinders 22 and 23 of the engine 20 are inserted into the exhaust ports 62 and 63, respectively. The coupling cylinders 8a and 9a have opened portions 8a1 and 9a1 projecting into the air cleaner casing 6.

As shown in FIG. 4, a cylindrical protruded portion 10 is formed to the bottom portion 6a of the air cleaner casing 6 so as to cover the inlet port 61 and project downward. The cylindrical protruded portion 10 has a side wall section to which a duct 11 having an opening 11a for an outer air introduction is connected. Furthermore, the bottom portion 6a is formed with a recessed portion 64 which projects inward the air cleaner casing 6 at a portion between the front side exhaust port 62 and the protruded portion 10 in a manner that the recessed portion 64 is formed from the left side wall section to the right side wall section of the air cleaner casing 6 in the width direction thereof. The both ends of the recessed portion 64 are opposed to the inside surface portions of the main frame pipes 2a and 2b, respectively.

In FIG. 4, reference numeral 12 denotes a movable valve for adjusting an opening area of the inlet port 61 and the movable valve 12 is actuated by means of a negative pressure motor 13.

The main frame pipes 2a and 2b are connected to each other through a first coupling member 14 disposed so as to transverse therebetween, and the first coupling member 14 is positioned inward the recessed portion 64 formed to the bottom portion of the air cleaner casing 6 in a state not contacting the air cleaner 5. The front end portion of the first coupling member 14 is positioned below the upper end portion of the opening 8a1 of the coupling cylinder 8a of the intake device 8. A pair of second coupling members 15 and 16 are disposed between the head frame pipe 3a and the first coupling member 14 and between the head frame pipe 3b and the first coupling member 14, respectively, as shown in FIG. 2.

According to the structures described above, an external air from an intake port 11a of the protruded portion 10 is introduced into the dirty side space S1 of the air cleaner 5, and the introduced air is fed to the element 7 in which dirt or the like is removed and then conveyed to the clean side space S2, through which the air is fed into the intake devices 8 and 9. The air from the air cleaner 5 and the fuel injected from the injectors 17 and 18 are mixed in the intake devices 8 and 9 and the air/fuel mixture is then fed to the cylinders 22 and 23.

Furthermore, according to the frame structure of the present embodiment, since the bilateral pair of main frame pipes 2a and 2b are connected through the first coupling member 14, even if a torsion force is applied to the motorcycle body to twist the main frame pipes 2a and 2b, the first coupling member 14 acts to reduce the twisting torsion force and to easily return the main frame pipes 2a and 2b to the original states thereof, thus improving the rigidity of the entire frame structure of the motorcycle against the torsion force applied thereto and maintaining a stable steering maneuvability of the motorcycle. Still furthermore, since the first coupling member 14 is connected to the head frame pipes 3a and 3b through the second coupling members 15 and 16, the rigidity against the torsion force can be further improved.

Still furthermore, according to the present invention, since the air cleaner 5 is formed with the recessed portion 64 for preventing it from being interfered with the location of the first coupling member 14, and although the inner volume of the air cleaner 5 is reduced by an amount corresponding to the recessed portion 64, the air cleaner 5 is formed with the protruded portion 10 at the bottom portion 6a thereof, so that the volume reduction can be compensated for by the protruded portion 10, thus achieving a suitable intake performance.

It is to be noted that the present invention is not limited to the described embodiment and many other changes and modifications may be made without departing from the scope of the appended claims. For example, the present invention is applicable to a motorcycle having an engine in which cylinders are supported in a state inclined forward as well as V-type arrangement.

What is claimed is:

1. A motorcycle having a head pipe supporting a steering shaft, a pair of bilateral main frame pipes having front ends fixed to the head pipe and extending rearward therefrom, an engine unit disposed below the main frame pipes and having cylinders projecting obliquely forward from an engine casing, an air cleaner covered by an air cleaner casing which is disposed between both the main frame pipes, and intake devices extending upward from the cylinders and having air intake inlet portions inserted into the air cleaner casing, said air cleaner casing having a bottom portion to which a downwardly protruded portion is formed at a rear position of the intake devices, and said main frame pipes being connected through a first coupling member disposed between the intake devices and the protruded portion of the air cleaner casing.

2. A motorcycle according to claim 1, wherein said air cleaner casing is formed with a recessed portion at the bottom portion thereof, said recessed portion having a shape suitable for accommodating the first coupling member.

3. A motorcycle according to claim 2, wherein said recessed portion has an inner space having a volume corresponding to an inner volume of said protruded portion.

4. A motorcycle according to claim 1, further comprising a pair of bilateral head frame pipes having front ends fixed to the head pipe and extending rearward therefrom below the location of the main frame pipes, and second coupling members connecting the first coupling member to each of the head frame pipes.

5. A motorcycle according to claim 1, wherein said first coupling member is arranged at a portion near and below the inlet portions of the intake devices inserted into the air cleaner casing.

6. A motorcycle according to claim 1, wherein said cylinders provides a V-shape in a side view of a motorcycle body and includes a front side cylinder projecting obliquely forward from the engine casing and said protruded portion of the air cleaner casing is positioned between the V-shaped cylinders.

* * * * *